United States Patent [19]

Manlow

[11] Patent Number: 5,709,503
[45] Date of Patent: Jan. 20, 1998

[54] METHOD AND APPARATUS FOR RESTORING A PIPE OR TUNNEL

[75] Inventor: Terence Victor Manlow, Frimley, United Kingdom

[73] Assignee: M.J. Clancy & Sons Limited, Harefield, United Kingdom

[21] Appl. No.: 349,441

[22] Filed: Dec. 5, 1994

[51] Int. Cl.[6] .............. F16L 1/00; F16L 55/18
[52] U.S. Cl. .............. 405/154; 138/97; 405/156
[58] Field of Search .............. 405/154, 146, 405/150.1, 184, 156; 138/97; 166/55, 55.1, 55.7; 156/287, 294

[56] References Cited

U.S. PATENT DOCUMENTS

| | | | |
|---|---|---|---|
| 2,794,758 | 6/1957 | Harper et al. | 405/154 X |
| 3,422,631 | 1/1969 | Silverman | 175/62 X |
| 3,543,377 | 12/1970 | Bremner | 405/154 X |
| 4,009,063 | 2/1977 | Wood | 405/150.1 X |
| 4,135,958 | 1/1979 | Wood | 405/150.1 X |
| 4,602,974 | 7/1986 | Wood et al. | 405/150.1 X |
| 4,657,436 | 4/1987 | Yarnell | 405/154 |
| 4,756,644 | 7/1988 | Williams | 405/154 |
| 4,770,562 | 9/1988 | Muller et al. | 405/154 |
| 4,848,964 | 7/1989 | Yarnell | 405/154 |
| 4,911,579 | 3/1990 | Lutz et al. | 405/154 X |

FOREIGN PATENT DOCUMENTS

| | | |
|---|---|---|
| 0146331 | 6/1985 | European Pat. Off. |
| 714105 | 8/1954 | United Kingdom . |
| 2122299 | 1/1984 | United Kingdom . |
| 2260180 | 4/1993 | United Kingdom . |
| 9010173 | 9/1990 | WIPO . |

*Primary Examiner*—Dennis L. Taylor
*Attorney, Agent, or Firm*—Ladas & Parry

[57] ABSTRACT

A device for reducing deformation of a pipe or tunnel has a body portion having a surface for moving along and entirely inside an undeformed pipe. The surface tapers inwardly from a main body portion having a maximum transverse extent to a fore end. Attached to the fore end of the device is a towing eye for attachment to a towing cable so that the device may be moved through a pipe. Movement of the device through the pipe urges the deformed portion towards an undeformed configuration. In an embodiment of the device it draws a lining through the pipe so that simultaneous re-rounding of a pipe and lining is performed. In yet another embodiment a pre-liner is simultaneously deployed with the lining, the pre-liner being disposed in use between the pipe and the lining.

34 Claims, 7 Drawing Sheets

METHOD AND APPARATUS FOR RESTORING A PIPE OR TUNNEL

BACKGROUND OF THE INVENTION

1. Field of the Invention

The present invention relates to a device for reducing deformation of a pipe or tunnel, to a device for reducing deformation of and lining a pipe or tunnel and to a method of reducing deformation of and lining a pipe or tunnel.

2. Description of the Related Art

Restoration of a pipe, conduit, passageway, tunnel or the like, such as a sewer or culvert, hereinafter referred to as a pipe, is often carried out by excavating down to the pipe and rebuilding or replacing the pipe as required. Under certain circumstances it has been found preferable to excavate or and provide a new loop pipe and to connect into the existing pipe which is then closed off.

Techniques involving excavation have proved to be time consuming and thus expensive. Where a pipe passes beneath a building, excavation may be inappropriate.

Therefore in recent years there have been developed a number of alternative methods for restoring pipes without the need for excavation. These alternatives are referred to as "no-dig" techniques.

Known "no-dig" techniques include so-called "slip-lining", in which a lining significantly smaller than the pipe is drawn into the pipe and lateral connections reconnected by open cut excavation. The annulus between the liner and the pipe is then filled with cementatious grout to stabilise the whole structure. The lining is impervious, thus preventing leakage and also usually has a smooth surface, speeding the flow of liquid through the lined pipe. This method has the disadvantage of significantly reducing the bore of the pipe and consequently the carrying capacity. Another known technique involves pulling in a folded tube of lining material consisting of a felt impregnated with resin, and once the lining tube is drawn fully into the pipe, using fluid or air pressure to urge the resin-soaked felt into proximity with the pipe walls. The resin is allowed to cure, producing in situ a formed rigid or semi-rigid lining.

Another method of inserting a resin-soaked felt tube involves turning the tube inside out and then using fluid pressure applied to the inside of the lining to cause the lining to evert while the forward end of the lining travels along the inside of the pipe.

Despite the existence of the no-dig techniques, problems still occur where the pipe becomes deformed. Deformation is normally recognised during a survey of the pipe prior to relining. Where a single area of deformation exists within a relatively long pipe run it has frequently been the practice to excavate at the area of deformation, to refurbish that area separately and then to line the whole pipe, including the refurbished area, using one of the known no-dig techniques. Another possibility has used a special expander device which is drawn to the location of a deformation and then, whilst stationary in the pipe, operated so as to urge the walls of the pipe towards the undeformed configuration, after which lining may be effected.

The use of such an expander is however not always successful since forces external to the pipe may immediately re-deform the pipe, or the pipe may collapse.

It is accordingly an object of the present invention to at least partially ameliorate the above-mentioned difficulties.

SUMMARY OF THE INVENTION

According to a first aspect of the present invention there is provided a device for reducing deformation of a pipe (as hereinbefore defined), having a body portion arranged to move entirely inside an undeformed pipe whereby said device acts upon a deformed portion of pipe and by virtue of movement along said pipe urges said deformed portion towards an undeformed configuration.

Preferably the body portion has a fore end which inwardly tapers from a main body portion.

Advantageously said device is used in combination with moving means for moving said device through a pipe.

According to a second aspect of the present invention there is provided a device for reducing deformation of a pipe (as hereinbefore defined), having a body portion arranged to move entirely inside an undeformed pipe whereby said device acts upon a deformed portion of pipe and by virtue of movement along said pipe urges said deformed portion towards an undeformed configuration, said device further having means for attaching a lining for said pipe, whereby movement of said device through said pipe simultaneously draws said lining into said pipe.

Preferably said device further has means for deploying a pre-liner to said pipe which pre-liner is disposed in use between the pipe and the lining.

According to a third aspect of the present invention there is provided a device for reducing deformation of a pipe (as hereinbefore defined), having a body portion arranged to move entirely inside an undeformed pipe whereby said device acts upon a deformed portion of pipe and by virtue of movement along and said pipe urges said deformed portion towards an undeformed configuration, and a chamber extending rearwardly of said body portion for simultaneous eversion therein of a lining for said pipe.

Preferably the outer periphery of the chamber is smaller than said body portion outer periphery.

Advantageously said chamber is flexible in at least a longitudinal direction of movement through said pipe.

Conveniently the chamber is flexibly connected to said device.

Preferably said device has a camera mount for mounting a camera for monitoring of a lining being everted within said chamber.

Advantageously a pre-liner cartridge is disposed circumferentially about said camera mount for holding a concertinaed pre-liner therein, which pre-liner in use is disposed between the pipe and the lining and the deployment of which is also monitored by said camera.

Conveniently the means for moving said device through said pipe comprises a draw cable.

Advantageously the device is formed by plural circumferential sections.

Preferably the apparatus further comprises remotely-operable means for reconfiguration of said device.

Advantageously the means for reconfiguring said device is adapted to separate the sections of said device from one another.

Advantageously there is provided a control cable for remotely operating said means for reconfiguring.

Conveniently, means are provided for determining that said device is immovable within said pipe whereby tension is released from said draw cable and tension applied to said control cable to operate said means for reconfiguring.

Conveniently there is provided a mount for a camera proximate the forward extremity of said device, whereby a camera may be mounted for monitoring the interaction of said device with said pipe or tunnel.

According to a fourth aspect of the present invention there is provided a method for reducing deformation of and lining a pipe or tunnel comprising the following steps:

(a) providing a device for reducing deformation of a pipe (as hereinbefore defined), having a body portion arranged to move entirely inside an undeformed pipe whereby said device acts upon a deformed portion of pipe and by virtue of movement along said pipe urges said deformed portion towards an undeformed configuration.

(b) moving said device longitudinally entirely inside a portion of said pipe;

(c) locating a lining within said portion of said pipe substantially contemporaneously with said moving step.

Preferably said locating step includes everting a liner into said portion of said pipe.

Alternatively said locating step includes panel lining of said pipe where said pipe is man enterable.

Alternatively said locating step includes drawing in a liner attached to said device.

BRIEF DESCRIPTION OF THE DRAWINGS

The invention will now be described by way of example, with reference to, the accompanying drawings in which.

In the Figures like reference numerals indicate like parts.

DESCRIPTION OF THE PREFERRED EMBODIMENTS

Figure 1:
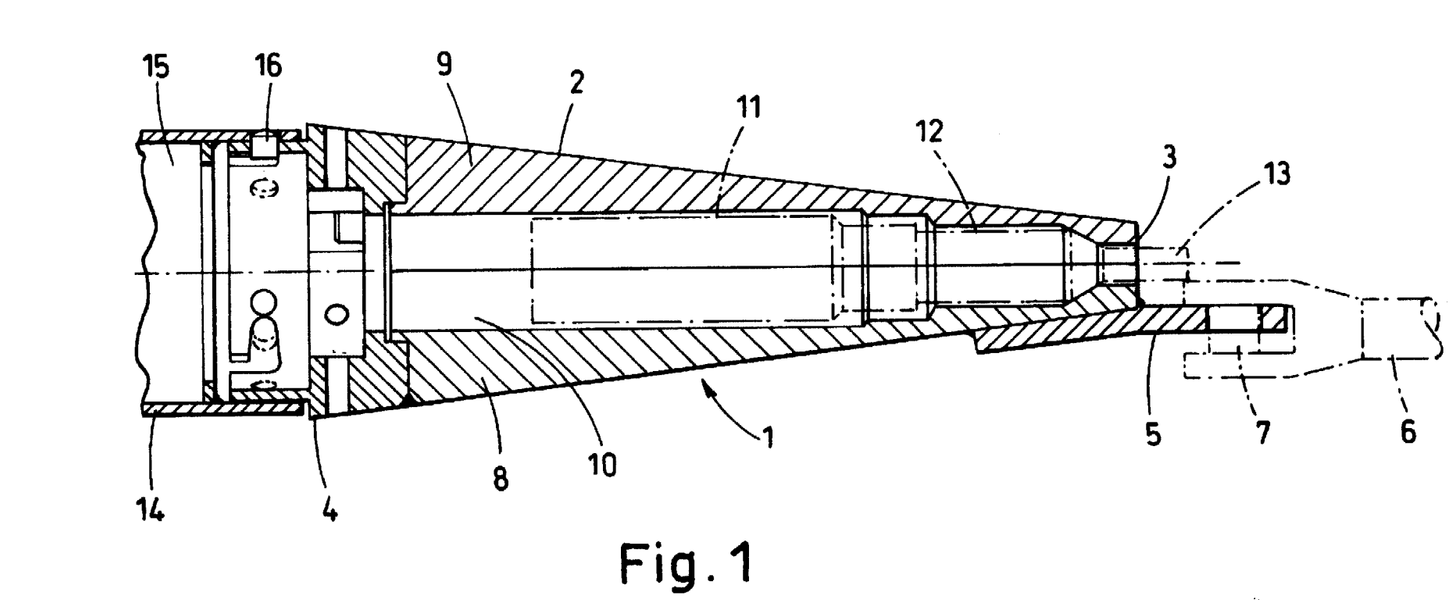
FIG. 1 shows a longitudinal cross-sectional view of a device for reducing deformation of a pipe in accordance with the first aspect of this invention.

Referring to FIG. 1 a device 1 has a body portion with a longitudinal axis A—A and a surface 2 for engaging a deformed portion of a pipe. The surface 2 tapers inwardly from a main body portion 4 having a maximum transverse extent to a fore end 3. Attached to the fore end of the device is a towing eye 5 for attachment to a towing cable 6 by a coupling 7 so that the device may be moved through a pipe. In this embodiment which is particularly suitable for small diameter pipes the device 1 is frusto-conical and consists generally of two halves 8 and 9 meeting along a parting plane parallel to the longitudinal axis A—A. The two halves, when assembled together, enclose a cavity 10 co-axial with the device and generally open towards the rear of the device, the cavity being adapted to receive a camera 11 and electrical connector 12. The camera which may be a black and white CCD imaging camera is coupled via the connector 12 to an electrical cable 13.

In the embodiment shown the device 1 is connected at the rear to a chamber member 14 which defines a chamber 15 which chamber is open to the rear. The chamber member 14 is connected to the device 1 by a flexible coupling 16 whereby the axis of the device and a longitudinal axis of the chamber can be mutually displaced.

Instead of a chamber, the device 1 may have a hook, eye or other attachment for pulling-in a resin soaked felt liner for later curing against the sewer walls. Alternatively the device may have suitable fittings, known in the art, for pulling in a slip-liner.

Figure 2:
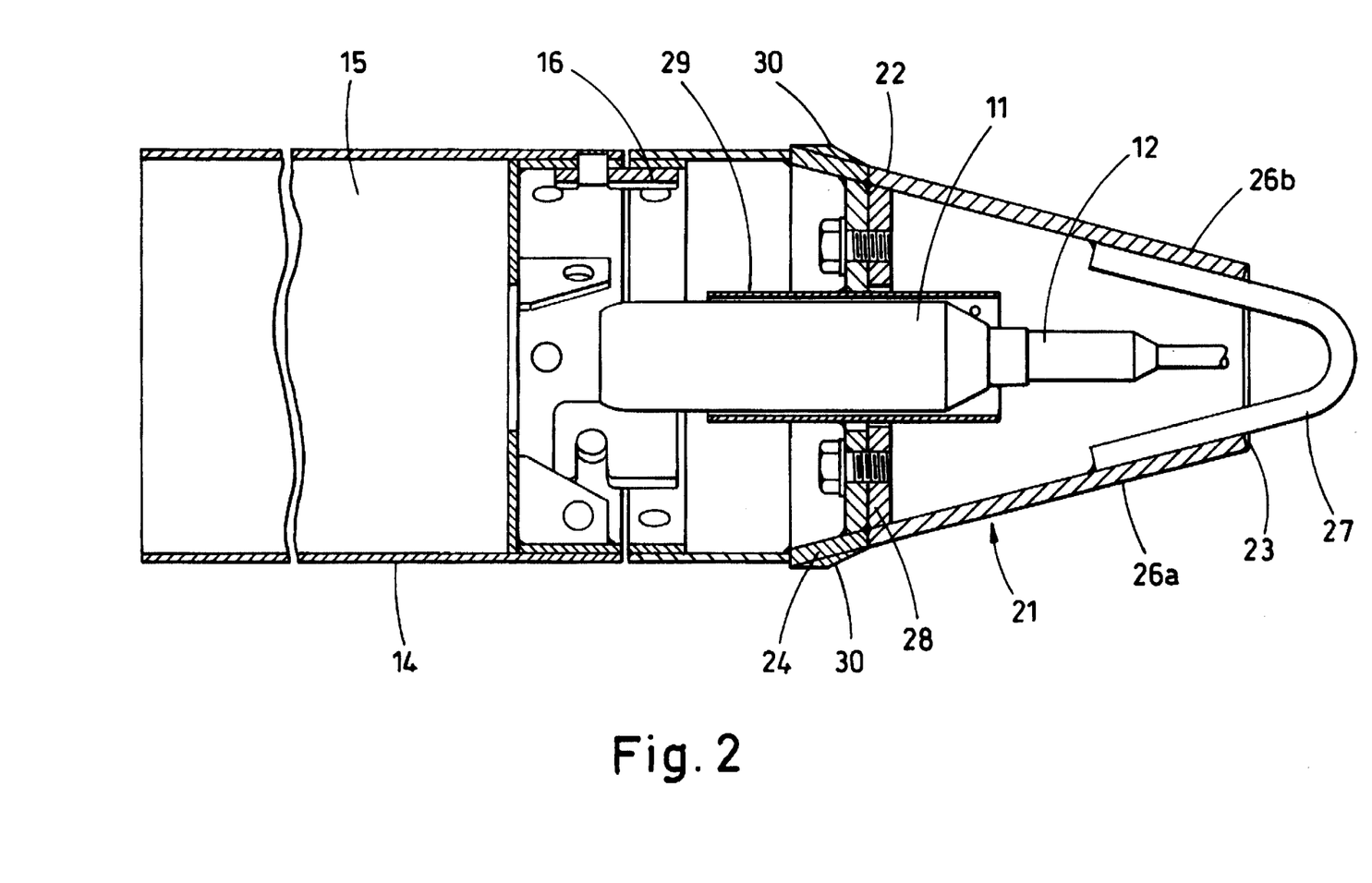
FIG. 2 shows a second embodiment of the device of this invention.

Referring to FIG. 2 a second embodiment of the device 21 again has a surface 22 for engaging inside a deformed portion of a pipe or tunnel. The surface also tapers inwardly from a main body portion 24 of maximum transverse extent to a fore end 23. The surface is defined by a plurality of generally co-extensive members 26a, 26b which are connected side-by-side to provide a generally frusto-conical body. A towing arrangement 27 consisting of a generally U-shaped member is attached to the fore end of the frusto-conical body so as to protrude forward from the fore end 23 of the body. A generally annular transverse internal wall 28 engages and supports the surface-defining members 26a, 26b and the central hole of the annular wall 28 encloses and supports a camera mount 29.

The device 21 shown in FIG. 2 also has a chamber member 14 attached to the rear thereof. The above-mentioned alternatives of a hook or the like, or fittings for a slip-liner are of course also possible. Where the device is large enough for man entry, panel lining may be effected from within the chamber member 14, as yet another alternative.

In both FIG. 1 and FIG. 2 the diameter of the external wall of chamber member 14 is slightly less than the maximum transverse extent of the device. This is for reduction or friction as will be described later herein.

FIG. 2 also shows external longitudinal fin members 30 of the main body portion 24 proximate the region of maximum transverse extent. These fin members also serve for friction reduction, as will be described later herein.

The device shown in FIG. 2 is particularly suitable for pipes where access is restricted. In the case of sewers or culverts, access to the sewer or culvert is frequently via manhole. Manholes tend to be of similar size regardless of the size of sewer or culvert to which they give access. To that end the device of FIG. 2, being of multiple sections may be passed through the manhole section-by-section and the device itself then assembled in situ in the sewer or culvert.

Figure 3:
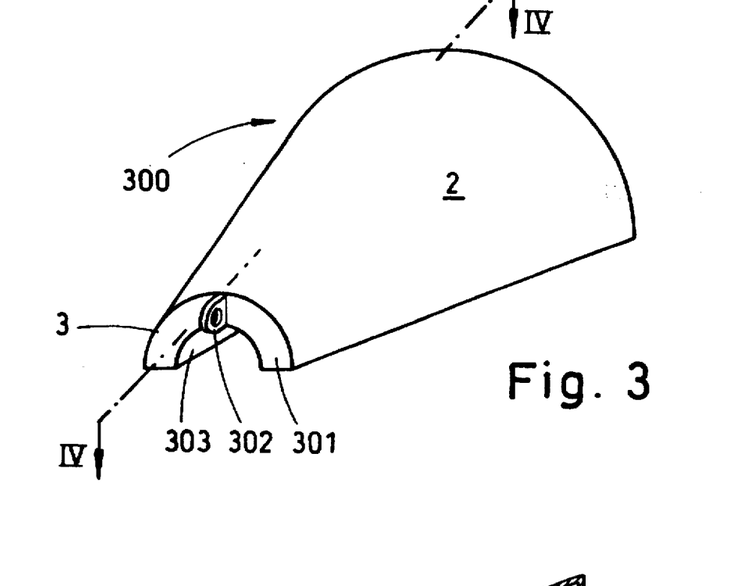
FIG. 3 is a perspective view of part of a further embodiment of the device of the invention.
Figure 4:
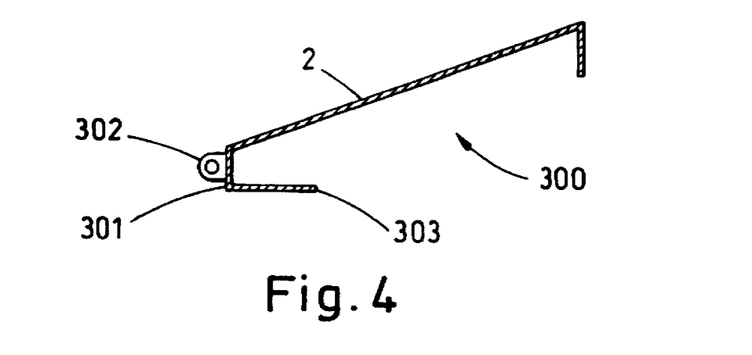
FIG. 4 is a sectional view along line IV—IV of FIG. 3.

A modification of the device 1 shown in FIG. 1 will now be described with respect to FIGS. 3 and 4. FIG. 4 shows a body 300 which corresponds generally to the upper half 9 of the device 1 shown in FIG. 1. As will be seen more clearly in FIG. 4, body 300 is made of a sheet or plate of material, the body having a generally semi-circular cross-section perpendicular to the longitudinal axis IV—IV which radially increases along that axis. At the smaller, forward end 3 the plate or sheet forms a C-shaped member 301 which supports a forwardly directed eye 302. The radially inner periphery of the C-shape extends rearwardly from C-shaped member 301 as a member 303 which defines a semi-cylindrical passageway.

Figure 5:
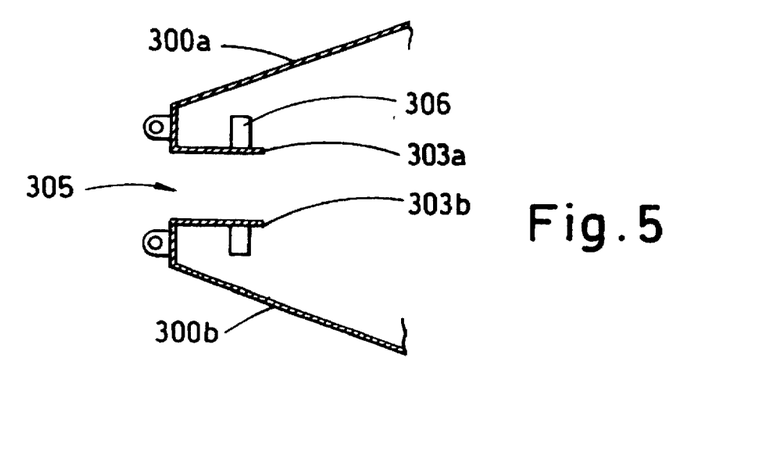
FIG. 5 is a sectional view showing the assembly of the device of FIG. 3.
Figure 6:
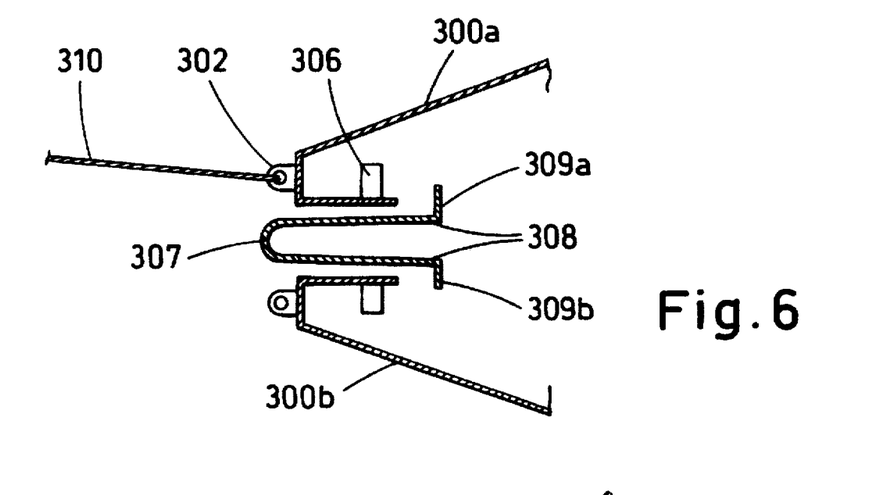
FIG. 6 is a sectional view of the device showing the attachment of the draw cable and control line.

When two bodies 300a, 300b are aligned together to produce a generally frusto-conical body the respective members 303a and 303b form a generally cylindrical structure which defines an internal cylindrical passageway 305 as seen in FIG. 5. An annular member 306 of suitable dimensions may be passed over members 303a and 303b to lock the two bodies together. Referring to FIG. 6, an omega-shaped hook member 307 may then be inserted through passageway 305 from within the body defined by members 300a, 300b. The omega-shaped hook member is a bifurcate member having two shank portions 308 generally parallel to the longitudinal axis of the hook member. Respective engaging portions 309a, 309b extend transversely from the free ends of the shank portions so that as the omega-shaped hook member 307 is fully inserted into passageway 305 the engaging members 309a, 309b abut the semi-cylindrical members 303a, 303b respectively of the bodies 300a, 300b. Tension may then be applied to hook member 307 and the two bodies 300a, 300b (which together make up a device 1) may then be moved in unison.

For ease of assembly or otherwise, it will be understood that annular member 306 may be attached to omega-shaped hook member 307 to form an integral structure.

During use of the device on end of a cable 310 is attached to one of the eye members 302 and the other end of the cable is attached to a remotely operable pulling means. If the device 1 becomes immovably lodged in a passageway, tension on omega-shaped hook member 307 is relaxed, and instead tension is applied to cable 310. In response to sufficient tension, one body 300a will move forwardly, the respective semi-cylindrical member 303a sliding out of engagement with ring 306 so the device is reconfigured. Half body 300a may then be drawn by continued tension on cable 310 until it is entirely separated from half body 300b, the reduced outer dimensions of the single half body in this configuration being considerably less than that of the device 1.

Figure 7:
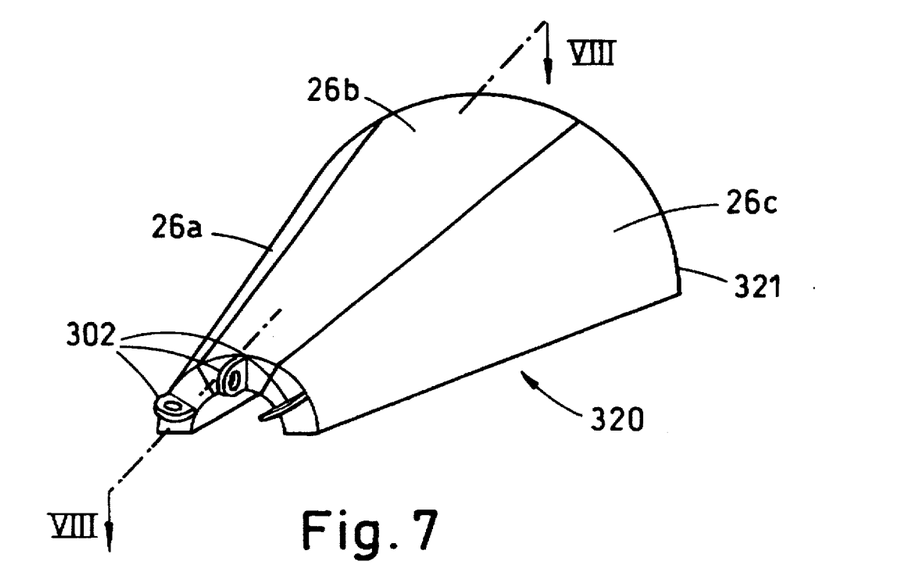
FIG. 7 is a perspective view of part of yet a further embodiment of the device of the invention.
Figure 8:
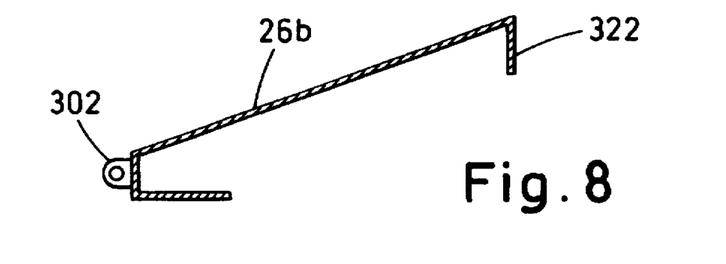
FIG. 8 is a sectional view along line VIII—VIII of FIG. 7.

It will be understood that where a device 1 is attached to a chamber member 14, movement of the upper half 300a of a device 1 independently of the lower half 300b of the device would be prevented if the chamber member 14 were a single cylindrical member. For that reason where the remotely operable pulling means for reconfiguration of the device is included, the chamber is in practice defined by two semi-cylindrical members corresponding to the upper and lower half devices respectively.

Where the device 21 is made up of plural sections 26a, 26b, 26c these are attached together so as to form two half devices. Referring to FIGS. 7 and 8, 320 represents the upper half of a device 21, and is made up of three sections 26a, 26b, 26c. At the rear end 321 the sections have a transversely extending lip 322 and the sections 26a, 26b, 26c are attached together with a ring 306 (not shown) to form a body similar to body 300.

Figure 9:
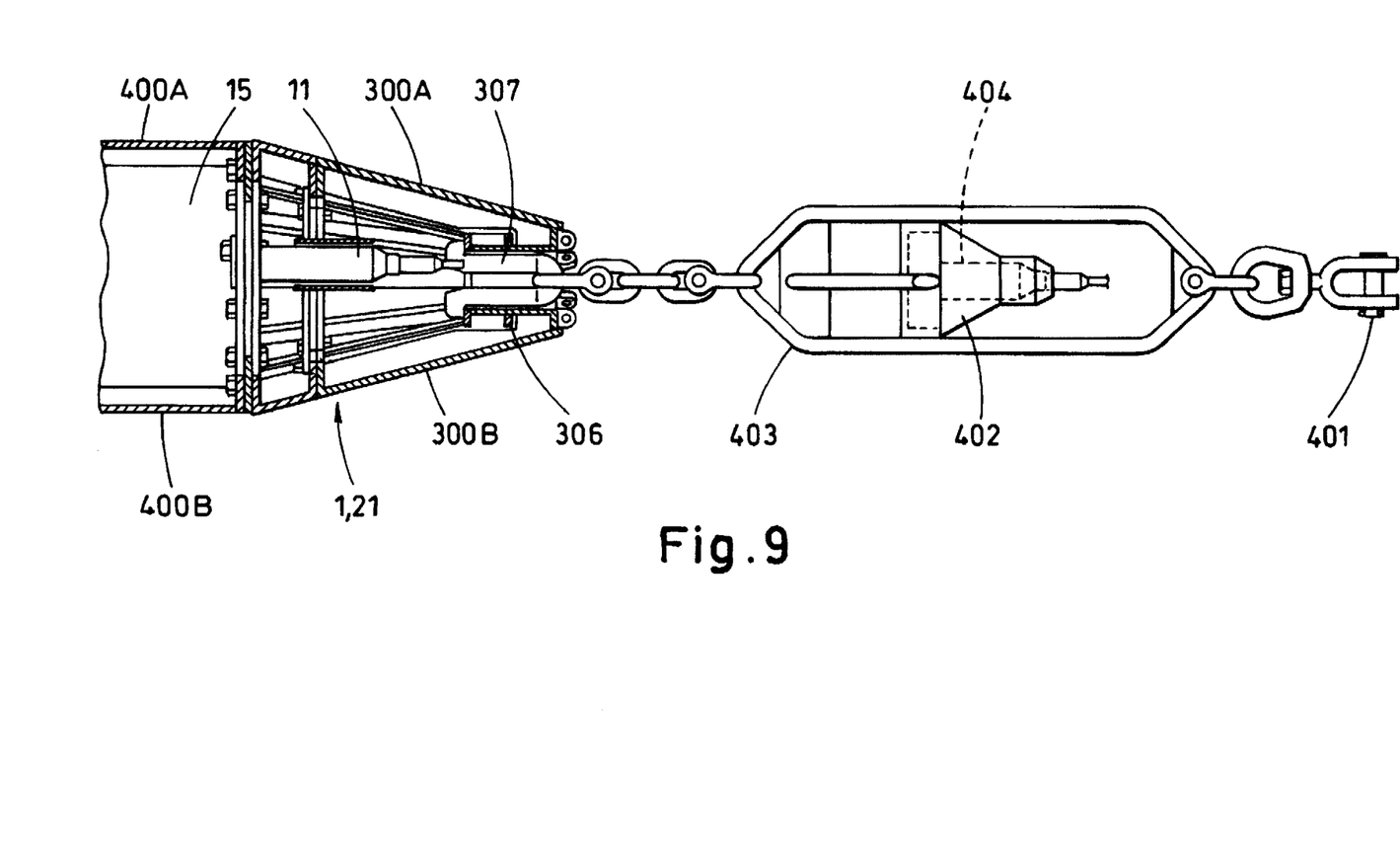
FIG. 9 shows a device of the invention coupled to a draw-linkage incorporating a forward camera.

FIG. 9 shows the device 1, 21 with an associated eversion chamber 15 defined by two semi-cylindrical members 400a, 400b, as described above, the device 1, 21 being coupled to a shackle member 401 for attachment to a pulling cable, via a linkage arrangement which includes a forward camera mount 402. The forward camera mount is contained within an enlarged linkage member 403 and supports a rear-facing camera 404 capable of monitoring the operation of device 1, 21 as it engages a deformed pipe or tunnel.

Figure 10:
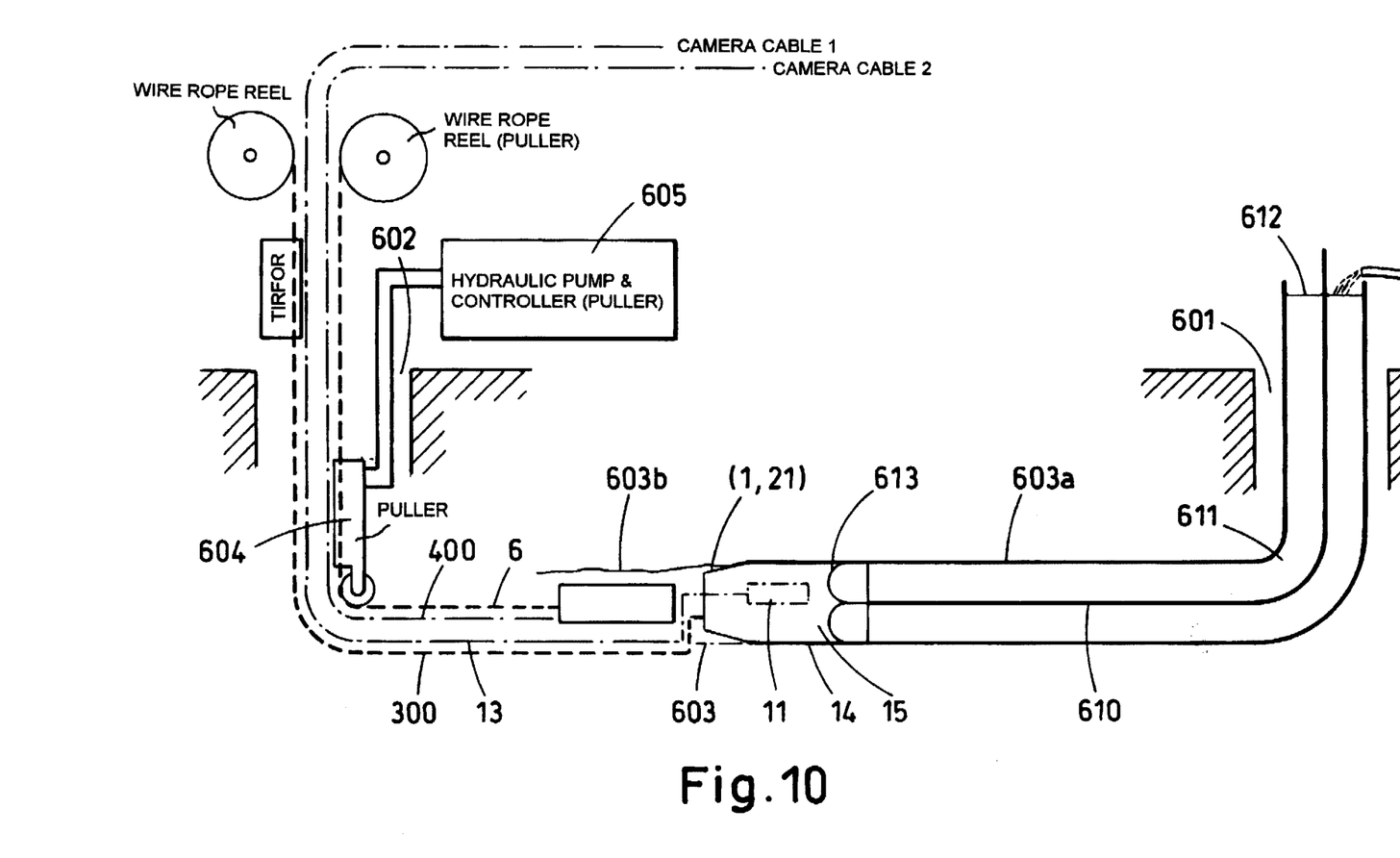
FIG. 10 shows the device of the invention in use.

The operation of the apparatus will now be described with respect to FIG. 10. First and second manholes 601, 602 give access to a length of sewer 603 which consists of a first undeformed portion 603a and a second deformed portion 603b.

During the manufacture and/or installation of sewers or culverts the diameter of the sewer or culvert has a given nominal diameter. At present regulations relating to refurbishment of sewers or culverts specify that a refurbished sewer or culvert should have a diameter reduced by no more than 10% of the original nominal diameter. Typically deformation of a sewer or culvert occurs due to subsidence of the ground around the sewer or culvert, which subsidence may be caused by leakage from the sewer or culvert itself.

Before commencing refurbishment of the sewer or culvert 603, the manhole covers are removed and ventilation carried out. Certain mandatory safety checks are then implemented before the sewer 603 is surveyed. During the survey the size and position of all lateral connection are accurately located and logged, and the general condition of the sewer is determined. Particularly important is the determination of the deformed portions 603b.

Intruding connections are then removed and the sewer is cleaned by high pressure water jetting. Other intrusions such as roots and also deposits of scale, fat or silt or the like are removed. A pulling cable 6 and electrical cable 13 are then introduced via manhole 602 and an end pulled along to manhole 601. A suitable pulling system 604, 605 is engaged with the pulling cable 6, this pulling system being located as appropriate. Specifically the pulling device 604 may be installed in the sewer itself and within the manhole 602 or a pulley device (not shown) may be placed in the junction between the manhole 602 and the sewer 603 and the cable pulled from above ground.

The size of the device 1, 21 is determined in dependence upon the minimum size of the undeformed portion of the sewer 603a. The diameter of the device 1, 21 is selected to be slightly smaller than this minimum size so that the device 1, 21 will pass readily through and inside of all undeformed sewer portions.

As mentioned above, where large diameter sewers or culverts are involved the large diameter device 21 may be assembled within the sewer or culvert itself. In any event the device 1, 21 is connected to the pulling cable 6 and the electric cable 13. Further connections are also made to the forward camera cable 400 and to the emergency release cable 300.

A suitable lining may be introduced at substantially the same time as the device 1, 21 is drawn through the sewer 603. The lining may be drawn into the sewer by physical attachment to the device 1, 21 or, as is preferred, an inside-out lining 610 may be everted within chamber 15 so as to engage the walls of the sewer, under the action of fluid, such as water 611. In this case, the lining is typically a polyester felt tube impregnated with polyester resin. The process of eversion of an inside-out lining onto the walls of a pipe or tunnel is itself known.

In operation using the eversion lining method, tension is applied to pulling cable 6 and device 1, 21 is drawn along inside sewer 603. While the device 1, 21 is within an undeformed portion 603a of the sewer, the device will move readily and care must be taken to ensure that water is introduced into the open end 612 of the lining at a sufficient rate to maintain the everting portion 613 of the lining within eversion chamber 15. Camera 11 is used to monitor the location of the everting portion 613 and to ensure that the portion 613 is maintained within chamber 15. The head of water is sufficient to urge the lining against the walls of the sewer.

When the device 1, 21 reaches a deformed portion 603b of sewer the tapering surface of the device engages the deformed portion of sewer and forward movement of the device urges the sewer out to a diameter corresponding to that of the maximum transverse extent of the device, and toward the minimum diameter of an undeformed sewer. The fin members 30, shown in FIG. 2, reduce the area of contact between the device 1, 21 and the deformed wall of the sewer and thus ease the movement forward-of the device 1, 21. Since the external diameter of chamber member 14 is slightly less than the maximum transverse extent of device 1, 21, the chamber member will tend not to be contacted by the undeformed portion of the sewer 603a, and will tend not to be contacted by portions of the sewer which have been re-shaped by the passage of device 1, 21. This again eases the forward passage of the apparatus.

In situations where it is required to simultaneously re-round and line a pipe or tunnel because significant infiltration is present or chemical contamination of the pipe line which might either accelerate or retard curing of the resin of the lining 610, or where the pipe material would be dissolved by the resin prior to curing, e.g. pitch fibre which contaminates the resin and prevents proper hardening, the use of a pre-liner to eliminate these potential problems can be achieved by introducing a pre-liner cartridge 32 (shown in FIG. 11) between the nose cone portion formed by members 26a, 26b and the chamber member 14. In the embodiment shown in FIG. 11, the chamber member 14 is coupled to the pre-liner cartridge 32 by a flexible joint 33. A tightly packed thin wall plastic tube which is a pre-liner 31 is concertinaed around the periphery of the camera mount 29 which is located rearwardly with respect to the embodiment of FIG. 2. Thus the pre-liner is located around the camera mount and within the cartridge 32. The pre-liner 31 is released by the forward movement of the device 21, the remote end of the pre-liner being fixed to the entrance of the pipe or tunnel.

Figure 11:
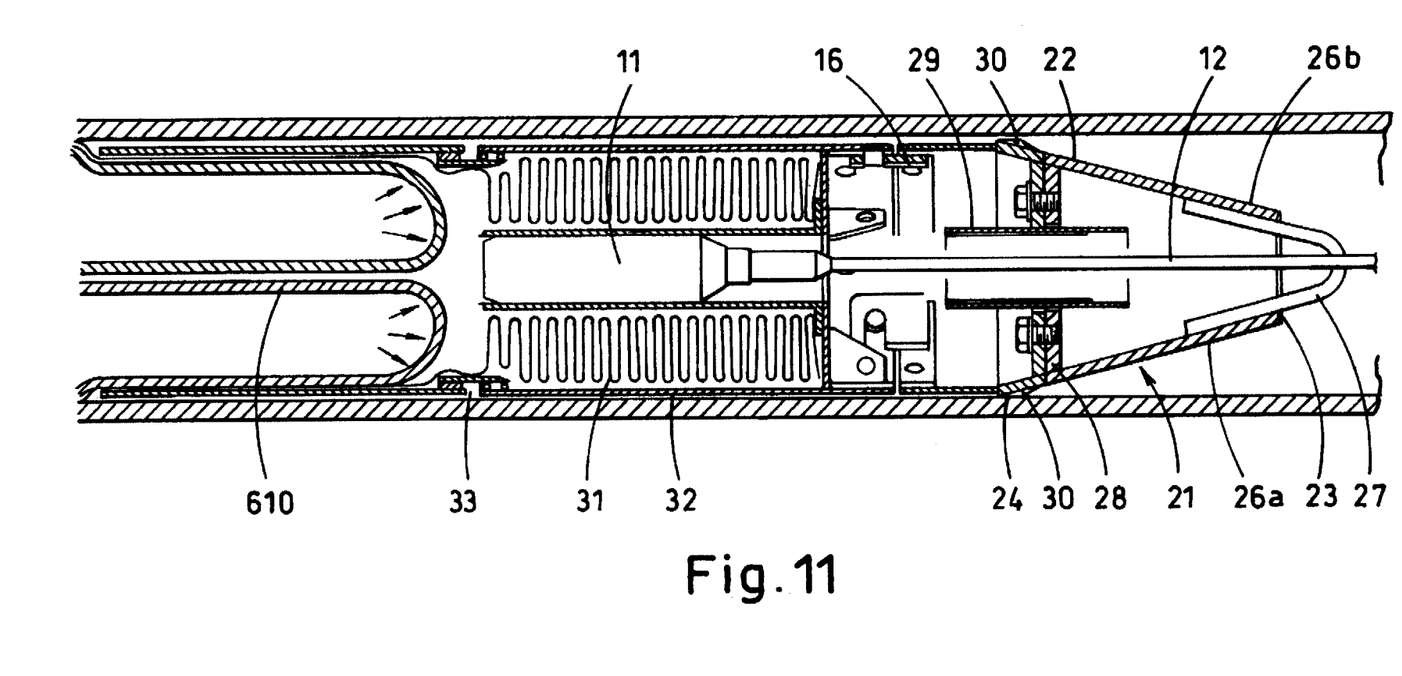
FIG. 11 shows a third embodiment of the device of this invention.

The camera 11 carefully monitors the eversion of the liner inside the eversion chamber 14 to ensure synchronisation of the everting liner and re-rounding device which ensure the liner immediately and automatically supports the pipe in its newly reformed shape. The camera 11 also monitors the release of the pre-liner. The installed liner 610 in its uncured state is protected by the pre-liner 31 from resin wash out by infiltrating water or chemical contamination or from dissolving the original pipe material, thus enabling proper curing to take place.

Under some circumstances the ground conditions or the condition of the material of the sewer itself will tend to cause the sewer to re-deform almost immediately device 1, 21 has passed therethrough. However the hydrostatic pressure in the liner immediately behind the eversion chamber 15 immediately and automatically supports the pipe in its newly reformed shape.

Normally the device 1, 21 will be drawn to the manhole 602 with the liner 610, 613 safely installed behind it.

As is known in the art warm water may then be circulated through the everted liner to cure the liner in place.

However despite an apparently satisfactory pre-survey, it may be found that the device 1, 21 becomes stuck at a particular deformed portion of the sewer. If this should occur, then tension is released from pulling cable 6 and reconfiguration cable 310 is then operated separately from cable 6. The reconfiguration cable causes the device 1, 21 to reconfigure, as described above, by the device 1, 21 splitting into two halves, whereby the reconfigured device 1, 21 may be drawn forward to the manhole 602. If this should occur then the length of lining which has been successfully installed may be cured and other work, for example excavation, carried out to restore the deformed portion of concern.

Once a liner has been installed and cured connections to laterals may be remade.

During the course of the pre-survey the configuration of the deformed portion of sewer pipe is noted. It has been found that under certain conditions the deformation of the pipe may cause the horizontal width of the pipe to increase while the transverse height of the pipe decreases. When the device 1, 21 has been passed through such a deformed portion of pipe, substantial circularity is restored. This is advantageous for the flow of liquid through the pipe but has the effect of leaving voids between the external periphery of the pipe and the surrounding soil. Accordingly during the pre-survey the types of deformation are located and logged, and where the above-mentioned "ovality" has been determined it has been found advantageous to bore from within the pipe through the walls of the original pipe and inject a grout material to at least partially fill any such voids. Boring through the wall may be carried out manually where man access is available, but where small pipes are involved, a robot may be used to drill through the wall and to insert grout into the void.

I claim:

1. A device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration, and said device further having means for deploying a lining for said pipe, whereby movement of said device through said pipe simultaneously draws said lining into said pipe.

2. A device as claimed in claim 1 further having means for deploying a pre-liner to said pipe which pre-liner is separate and distinct from said lining, and is disposed in use between the pipe and the lining.

3. A device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe body portion tapered outer surface urges said deformed portion towards an undeformed configuration, and a chamber extending rearwardly of said body portion for simultaneous eversion therein of a lining for said pipe.

4. A device as claimed in claim 3 wherein the outer periphery of the chamber is smaller than said body portion outer periphery.

5. A device as claimed in claim 3 wherein said chamber is flexibly coupled to said body portion whereby a longitudinal axis of the chamber may be displaced from a longitudinal axis of the body portion.

6. A device as claimed in claim 3, wherein the chamber is connected to said device by a flexible coupling.

7. A device as claimed in claim 3 wherein there is provided a camera mount for mounting a camera for monitoring of a lining being everted within said chamber.

8. A device as claimed in claim 7 wherein a pre-liner cartridge is disposed circumferentially about said camera mount for holding a concertinaed pre-liner therein, which pre-liner in use is disposed between the pipe and the lining and the deployment of which is also monitored by said camera.

9. A device as claimed in claim 1 wherein a draw cable is provided for moving said device through said pipe.

10. A device as claimed in claim 1 wherein the device is formed by plural circumferential sections.

11. A device as claimed in claim 10 further comprising remotely-operable pulling means, a control cable having one end thereof attached to said remotely operable pulling means and another end thereof attached to one of said circumferential sections whereby pulling on said control cable by said pulling means causes said device to be reconfigured by separating the sections of said device from one another.

12. A device as claimed in claim 11 wherein means are provided for determining that said device is immovable within said pipe whereby tension is released from said draw cable and tension applied to said control cable to operate said pulling means for reconfiguring said device.

13. A device as claimed in claim 1 wherein there is provided a mount for a camera proximate the forward extremity of said device, whereby a camera may be mounted for monitoring the interaction of said device with said pipe or tunnel.

14. A method for reducing deformation of and lining a pipe or tunnel comprising the following steps:
 (a) providing a device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration;
 (b) moving said device longitudinally entirely inside a portion of said pipe;
 (c) deploying a lining within at least said portion of said pipe substantially contemporaneously with said moving step.

15. A method as claimed in claim 14 wherein a chamber is provided extending rearwardly of said body portion and said deploying step includes everting a lining into said chamber.

16. A method as claimed in claim 15 wherein said liner is everted simultaneously with the deployment of a pre-liner disposed between the pipe or tunnel and the lining, and which pre-liner is separate and distinct from said lining.

17. A device as claimed in claim 3 further having means for deploying a pre-liner to said pipe, which pre-liner is separate and distinct from said lining, and is disposed in use between the pipe and the lining.

18. A device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration, and said device further having means for deploying a lining for said pipe, and means for deploying a pre-liner to said pipe which pre-liner is separate and distinct from said lining and is disposed in use between the pipe and the lining, whereby movement of said device through said pipe simultaneously draws said lining into said pipe and deploys said pre-liner.

19. A device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration, and a chamber extending rearwardly of said body portion for simultaneous eversion therein of a lining and of a separate and distinct pre-liner for said pipe, wherein said pre-liner is disposed between the pipe and the lining.

20. A device as claimed in claim 19 wherein the outer periphery of the chamber is smaller than said body portion outer periphery.

21. A device as claimed in claim 19 wherein said chamber is flexible in at least a longitudinal direction of movement through said pipe.

22. A device as claimed in claim 19, wherein the chamber is connected to said device by a flexible coupling.

23. A device as claimed in claim 19 wherein there is provided a camera mount for mounting a camera for monitoring of said lining being everted within said chamber.

24. A device as claimed in claim 23 wherein a pre-liner cartridge is disposed circumferentially about said camera mount for holding a concertinaed pre-liner therein, which pre-liner in use is disposed between the pipe and the lining and the deployment of which is also monitored by said camera.

25. A device as claimed in claim 18 wherein a draw cable is provided for moving said device through said pipe.

26. A device as claimed in claim 18 wherein the device is formed by plural circumferential sections.

27. A device as claimed in claim 26 further comprising remotely-operable pulling means, a control cable having one end thereof attached to said remotely operable pulling means and another end thereof attached to one of said circumferential sections whereby pulling on said control cable by said pulling means causes said device to be reconfigured by separating the sections of said device from one another.

28. A device as claimed in claim 27 wherein means are provided for determining that said device is immovable within said pipe whereby tension is released from said draw cable and tension applied to said control cable to operate said pulling means for reconfiguring said device.

29. A device as claimed in claim 18 wherein there is provided a mount for a camera proximate the forward extremity of said device, whereby a camera may be mounted for monitoring the interaction of said device with said pipe or tunnel.

30. A method for reducing deformation of and lining pipe means comprising the following steps:
 (a) providing a device for reducing deformation of a pipe means, having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration;
 (b) moving said device longitudinally entirely inside a portion of said pipe;
 (c) deploying a pre-liner within said pipe means, and
 (d) deploying a lining within said pipe means substantially contemporaneously with said moving step and with step (c), said pre-liner being located between the pipe means and the lining.

31. A method as claimed in claim 30 wherein said step (d) includes everting a lining into said pipe means.

32. A method for reducing deformation of and lining pipe means comprising the steps:
   (a) providing a device for reducing deformation of a pipe means, having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration;
   (b) moving said device longitudinally entirely inside a portion of said pipe;
   (c) deploying a pre-liner within said pipe means, and
   (d) everting a lining into said pipe means substantially contemporaneously with steps (b) and (c), said pre-liner being located between the pipe means and the lining.

33. A device for reducing deformation of a pipe (as hereinbefore defined), having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration, and a chamber extending rearwardly of said body portion for simultaneous eversion therein of a lining and of a separate and distinct pre-liner for said pipe, wherein said pre-liner is disposed between the pipe and the lining, said device further including a camera mounted on a camera mount for monitoring said lining being everted within said chamber, and a pre-liner cartridge disposed circumferentially about said camera mount for holding the pre-liner in a concertinaed form therein, said camera also monitoring deployment of said pre-liner.

34. A method for reducing deformation of and lining pipe means comprising the steps:
   (a) providing a device for reducing deformation of a pipe means, having a non-expandable body portion arranged to move entirely inside an undeformed pipe whereby said body portion has a tapered outer surface which tapers inwardly in a direction of motion in said pipe and which is sized to mechanically contact and act against a deformed portion of pipe and by virtue of movement along said pipe said body portion tapered outer surface urges said deformed portion towards an undeformed configuration;
   (b) providing said device with a chamber extending rearwardly of said body portion;
   (c) providing said device with a camera mount for mounting a camera;
   (d) providing said device with a pre-liner cartridge disposed circumferentially about said camera for holding a concertinaed pre-liner therein;
   (e) moving said device longitudinally entirely inside a portion of said pipe means;
   (f) deploying said pre-liner within said pipe means, and
   (g) everting a lining into said chamber, whereby said step of deploying said pre-liner and everting said lining occur at the same time as said step (e) and are monitored by said camera.

* * * * *